US 6,536,664 B2

(12) United States Patent
Nordqvist et al.

(10) Patent No.: US 6,536,664 B2
(45) Date of Patent: Mar. 25, 2003

(54) METHOD FOR EXCHANGING INFORMATION BETWEEN A CASH REGISTER AND A PAYMENT-PROCESSING DEVICE

(75) Inventors: Leif Nordqvist, Akersberga (SE); Karl-Willy Turegard, Lidingo (SE); Gunnar Olofsson, Lidingo (SE)

(73) Assignee: Cashguard AB, Taby (SE)

( * ) Notice: Subject to any disclaimer, the term of this patent is extended or adjusted under 35 U.S.C. 154(b) by 0 days.

(21) Appl. No.: 09/846,312

(22) Filed: May 2, 2001

(65) Prior Publication Data

US 2002/0030098 A1 Mar. 14, 2002

Related U.S. Application Data

(63) Continuation of application No. 08/981,182, filed as application No. PCT/SE96/00710 on May 30, 1996, now abandoned.

(30) Foreign Application Priority Data

May 30, 1995 (SE) ............................................. 9501983

(51) Int. Cl.$^7$ ............................................. G06F 17/00
(52) U.S. Cl. ........................... 235/379; 705/16; 705/17
(58) Field of Search ......................... 235/379, 462.14, 235/462.15, 462.07, 7 R; 705/16, 17, 21, 24

(56) References Cited

U.S. PATENT DOCUMENTS

| | | | |
|---|---|---|---|
| 3,038,157 A | 6/1962 | Simjian | 346/22 |
| 3,330,947 A | 7/1967 | Alpert et al. | 705/25 |
| 4,159,533 A | 6/1979 | Sakurai | 705/20 |
| 4,189,774 A | 2/1980 | Kashio | 705/25 |
| 4,310,885 A | 1/1982 | Azcua et al. | 705/16 |
| 4,337,864 A | 7/1982 | McLean | 209/534 |
| 4,359,630 A * | 11/1982 | Simonotti et al. | |
| 4,410,961 A * | 10/1983 | Dlugos et al. | |
| 4,434,359 A | 2/1984 | Watanabe | 235/379 |

(List continued on next page.)

FOREIGN PATENT DOCUMENTS

| | | |
|---|---|---|
| EP | 0 282 197 | 9/1988 |
| EP | 0 340 668 | 11/1989 |
| WO | WO 93/10511 | 5/1993 |

*Primary Examiner*—Thien M. Le
*Assistant Examiner*—Diane I. Lee
(74) *Attorney, Agent, or Firm*—Young & Thompson

(57) ABSTRACT

A system for the processing of payment and a signal-processing device having a first data port for communication with a case register (10). The signal-processing device (50) also includes a second data port for communication with a display arrangement a third data port for communication with a payment-processing device, and a buffer unit for storage of data. The device is intended, on receiving a first data quantity at the first data port, to deliver the first data quantity to a detector unit for checking a first data quantity;

the detector unit is arranged to convey the first data quantity onwards to the buffer unit, the buffer unit is arranged to temporarily store the received data and thereafter deliver it to the second data port, the detector unit is arranged to generate a detection signal as a function of a detected final code and to deliver this detection signal to the third data port;

a calculating unit is arranged to await a payment made signal from the third data port, and the calculating unit is arranged to generate an information quantity (380) as a function of receiving the payment made signal;

the signal-processing arrangement is arranged to generate a second data quantity as a function of the first data quantity and of the generated information quantity (380), and to deliver this second data quantity to the second data port.

19 Claims, 6 Drawing Sheets

U.S. PATENT DOCUMENTS

| | | | |
|---|---|---|---|
| 4,476,570 A | 10/1984 | Ootsuka | 704/270 |
| 4,571,489 A | 2/1986 | Watanabe | 235/379 |
| 4,733,765 A | 3/1988 | Watanabe | 235/379 |
| 4,761,542 A | 8/1988 | Kubo et al. | 235/379 |
| 4,787,037 A * | 11/1988 | Ootsuka | |
| 4,879,456 A | 11/1989 | Cherry et al. | 235/462.07 |
| 4,953,086 A | 8/1990 | Fukatsu | 705/42 |
| 5,052,504 A | 10/1991 | Ikeda et al. | 725/21 |
| 5,144,118 A | 9/1992 | Actis et al. | 235/462.18 |
| 5,258,604 A * | 11/1993 | Behrens et al. | 235/462.15 |
| 5,308,992 A | 5/1994 | Crane et al. | 250/556 |
| 5,347,113 A | 9/1994 | Reddersen et al. | 235/462.15 |
| 5,481,098 A | 1/1996 | Davis et al. | 235/462.07 |
| 5,615,759 A | 4/1997 | Cadbury | 235/383 |
| 5,703,347 A | 12/1997 | Reddersen et al. | 235/462.15 |

* cited by examiner

METHOD FOR EXCHANGING INFORMATION BETWEEN A CASH REGISTER AND A PAYMENT-PROCESSING DEVICE

This application is a continuation of application Ser. No. 09/981,182, filed Mar. 2, 1998, now abandoned which was the 35 USC 371 national phase of International application PCT/SE96/00710 filed on May 30, 1996.

BACKGROUND OF THE INVENTION

In the retrail trade it is known to use a cash register for keying in the prices of the goods which a customer is purchasing and also for keying in the amount which a customer has paid. According to the prior art, a cash register comprises means for calculating the total cost of the goods, also called the requested amount, and means for calculating the difference between the amount tendered and the requested amount.

According to the prior art, the cash register is coupled to a receipt printer. The cash register has a function for supplying information to the receipt printer so that the latter is able to print out a receipt. It additionally has a command function which activates the receipt printer. The cash register furthermore comprises a data processing unit for calculating for example, the difference between the amount tendered and the requested amount, this unit functioning in compliance with software specially adapted for the cash register.

It is also known to couple to a cash register a device for processing the means of payment, this device being of the CashGuard type (registered trademark) which is described in EP-A-0 615 643 and whose purpose is to process, i.e. receive and assess, banknotes and coins in a reliable manner. The object of this device is moreover to supply the correct amount of change and in this way to eliminate or reduce the risk of financial loss and/or the possibility of taking money which is not due. However, if this device for processing payment is to be able to perform its tasks, it needs to share the information which the cash register processes. An example of information of this kinds is the requested amount.

According to the prior art, it is necessary to adapt the abovementioned software in the cash register in order to supply the correct information to the device processing the means of payment, and in order to ensure that the correct printouts are supplied from the cash register to the receipt printer.

The cash register and the device for processing the payment have been coupled together by connecting the latter directly to an interface in the cash register, which interface, depending on the manufacture and design of the cash register, it has been necessary to modify in order to obtain the desired function. This has been shown to be complicated and time consuming since it has to be done for each model and manufacture of cash register which is to be used together with a payment-processing device. One is forced to make changes to the cash register's computer program, and this may require the assistance or the permission of the cash register manufacturer. In addition to this, today's cash registers are often built into a computer network, and this may mean that it is not possible for modifications or connections to be made without the entire checkout system having to be closed down.

SUMMARY

The problem to be solved by the invention compared to the nearest prior art is to enable joining up of a payment-processing device to a cash register and to a display arrangement without making it necessary to make modifications to the cash register.

One object of the present invention is to make available a system for the processing of means of payment including a payment-processing device which can be joined up, in an advantageously simple way, to a cash register and its receipt printer.

Another object of the present invention is to produce a payment-processing device which can be joined up to different types of cash registers without it being necessary to make modifications to the cash register, either in relation to its hardware or to its software.

A further object of this invention is to produce a device which, in a simple and cost-effective way, can upgrade existing cash registers, and can also, at limited expense, increase the reliability of processing of the means of payment.

These objects, and other ones which are evident from the following description, are achieved by a signal-processing device comprising a first data port for communication with a cash register, a second data port for communication with a display arrangement; and a third data port for communication with a payment-processing device. The signal-processing device also comprises means for receiving a first message at the first data port, control means for generating a second message as a function of the first messages and means for transmitting the second messages in a predetermined manner to the second data port as well as means for receiving a third message on the third data port, and means for generating an information quantity in response to the third message received on the third data port, the control means operating to deliver the generated information quantity to the second data port.

In an advantageous embodiment the system, according to the invention, for the processing of means of payment includes a signal processing device for cooperation with a computer program product such that control of the communication between the cash register, the payment-processing device and the display arrangement is effected. Such a computer program product comprises a recording medium;

means, recorded on the recording medium, for directing the signal-processing device to receive a first message from a cash register, means, recorded on the recording medium, for directing the signal-processing device, responsive to the received first message, to generate a second message; and means, recorded on the recording medium, for directing the signal-processing device to transmit the second message in a predetermined manner to a display arrangement;

means, recorded on the recording medium, for directing the signal-processing device to await reception of a third message from a payment-processing device;

means, recorded on the recording medium, for directing the signal-processing device to generate an information quantity in response to the third message;

means, recorded on the recording medium, for directing the signal-processing device to deliver the generated information quantity to the display arrangement.

The claimed recording medium is illustrated in an example below by a memory element, and the claimed means, recorded on the recording medium, for directing the signal-processing device is illustrated in an example below by a program routine stored in the memory element.

BRIEF DESCRIPTION OF THE DRAWINGS

In order to ensure that the present invention can be readily understood and implemented, it will be described by way of illustrative examples, with reference being made to the attached drawings in which.

DETAILED DESCRIPTION OF THE DRAWINGS

Figure 1:
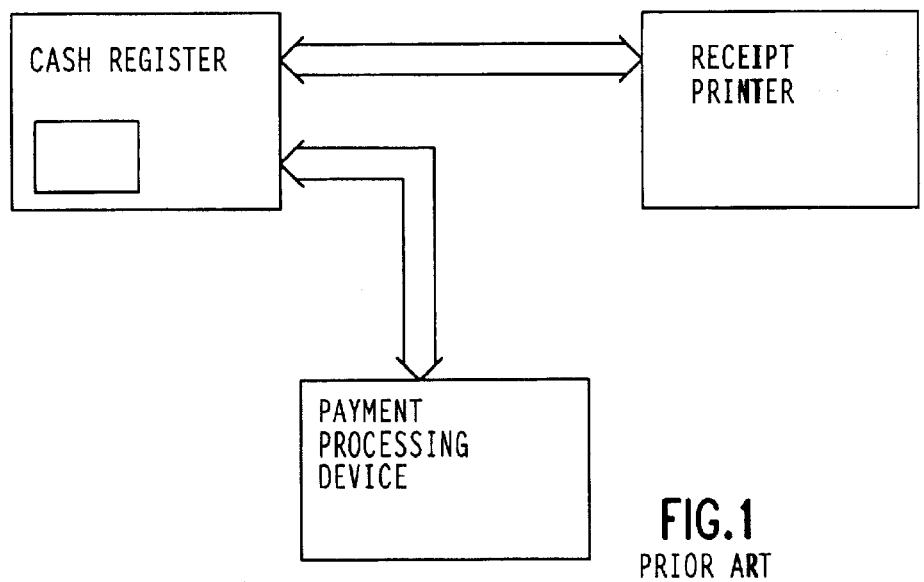
FIG. 1 shows a block diagram of a device according to the prior art.
Figure 2:
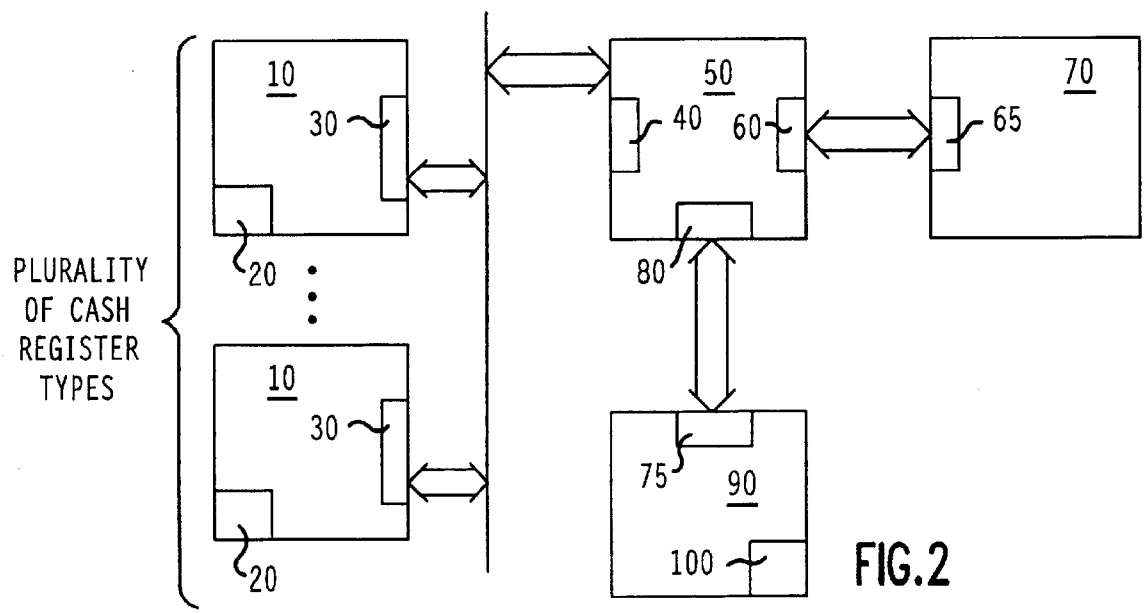
FIG. 2 shows a basic circuit diagram of an embodiment of the signal-processing device according to the present invention.

FIG. 2 is a basic circuit diagram of an embodiment of the system.

A cash register 10 comprises members 20 for keying in data, for example price information, and a data port 30 for data communication. The cash register 10 is connected via the data port 30 to a first data port 40 of a signal-processing arrangement 50, hereinafter called the arrangement 50.

The arrangement 50 comprises a second data port 60 for communication with the display arrangement 70, and a third data port 80 for communication with a device 90 for processing the means of payment, hereinafter called the device 90.

The display arrangement 70 can consist of a printer such as a receipt printer. Alternatively, it can be a screen or a combination of printer and screen.

Figure 3:
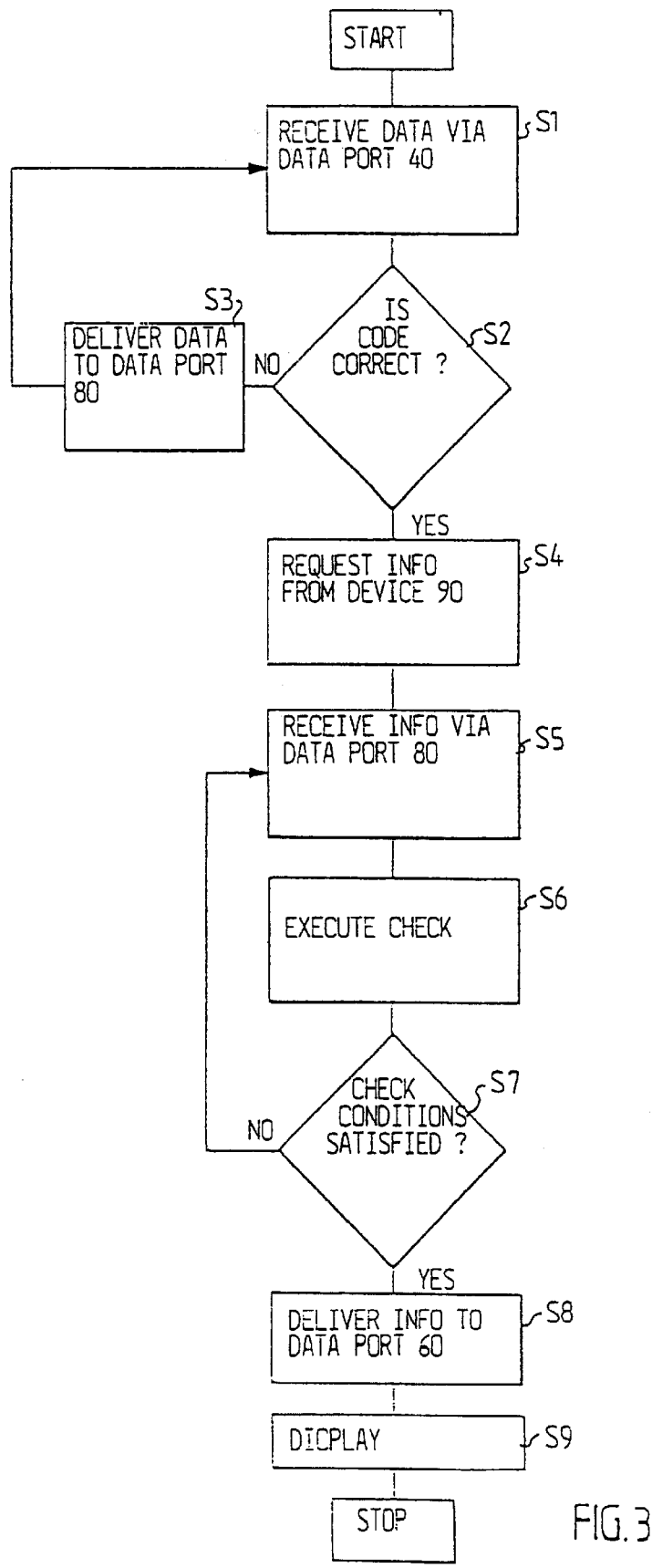
FIG. 3 shows a flow chart of a first embodiment of a procedure according to the invention.

FIG. 3 shows a flow chart of a procedure according to the invention. According to a first embodiment of the procedure, the latter comprises the stages of:

S1A Generating a first data quantity as a function of information keyed into the cash register 10, and making available the first data quantity in coded form in accordance with a first predetermined code;

S1B Delivering the first data quantity to the data port 40 via the data port 30;

S1C Receiving data from the data port 40. Tis data can comprise text and/or numerals, such as price information together with associated goods designation and number, for example "Toothbrush, 2', at X kronor";

S2 Deciding if the received data indicates a predetermined event such as the event that all price information and all goods information have been entered. This predetermined event could be indicated by a predetermined indicator signal or by a predetermined message indicating "receipt finalized". This message, or indicator signal, is generated by a cash register 10 which is connected to the data port 40;

S3 In the case where the received data does not correspond to the predetermined message, conveying the said data onwards to the data port 60. The data which is supplied to the data port 60 is conveyed onwards to the display arrangement 70, in order to control the function thereof. This control data can include such information as, for example, numerals and/or text which is to be printed out, configuration and set-up of the information, and information on whether the transmitted information is to be displayed. Stage S1 then follows once again.

S4 In the case where the received data does correspond to the predetermined message, the arrangement 50 requests information concerning the actual value of the amount tendered. This value is generated by the device 90 as banknotes and/or coins are fed into the device 90. Alternatively, the actual value of the amount tendered can be generated by means of a card reader which reads an account card in a well known manner;

S5 Receiving information on the tendered amount from the device 90 via the data port 80;

S6 Checking the information. This check can include a calculation of whether the ratio between the amount tendered and the requested amount satisfies certain conditions;

S7 In the case where the check conditions have not been satisfied, stage S5 must be repeated. If the check conditions are satisfied, information concerning the requested amount and information concerning the amount tendered will be supplied to the data port 60 (stage S8);

S9 When this stage in the procedure is reached, the data which has been received from the data port 40 has been treated in accordance with the stages described above, which means that a secure payment for goods has been obtained at the device 90. The arrangement 50 controls the display arrangement 70 so that the latter displays selected information.

Figure 4:
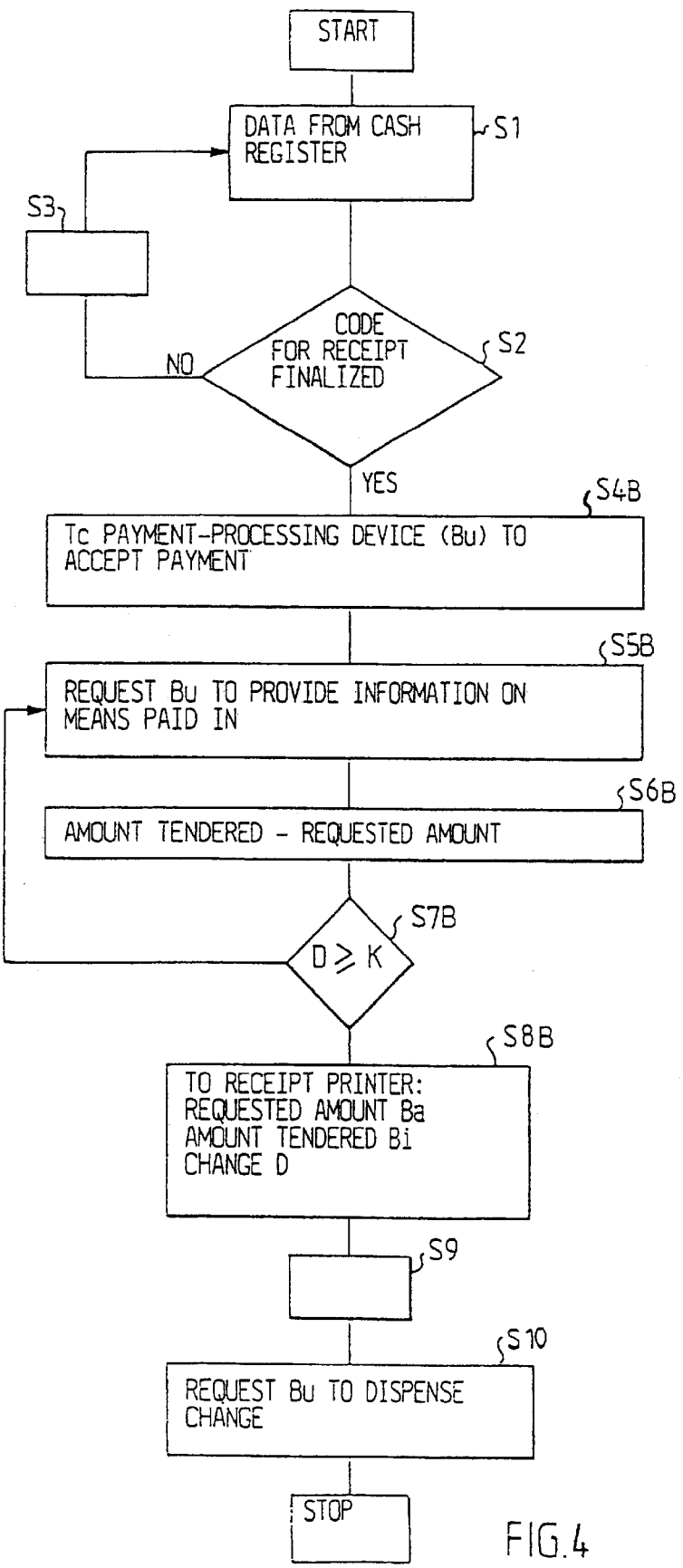
FIG. 4 shows a flow chart of a second embodiment of the procedure.

A second embodiment of the procedure is illustrated in FIG. 4. According to the second embodiment, the first stages correspond to the above-described stages S1A, S1B, S1C, S2 and S3.

The predetermined message which is checked in stage S2 is the message indicating receipt finalized, i.e. a confirmation from the cash register that the price information for all the goods a customer wishes to purchase has been keyed in. When, in stage S2, the predetermined message has been received and has been found to be correct, the stages carried out according to the second embodiment are:

S4B Sending a message to the device 90 for processing the means of payment, with an instruction to request that the operator feed in the means of payment.

Stages S5B and S6B are then carried out.

In stage S5B the device 90 generates a request signal to an operator to the effect that means of payment need to be fed in. This signal can be displayed via a display member 100 arranged on the device 90. According to one variant of the invention, the request signal is delivered to the display arrangement 70 in order thereby to draw the operator's attention to the fact that means of payment need to be fed in.

According to the second embodiment, the stage S6B comprises calculating a difference D between the amount tendered $B_i$ and the requested amount $B_a$.

$$D=B_i-B_a.$$

According to the second embodiment of the procedure, the difference D is compared with a preset value K. The value K determines what difference D can be accepted between the amounts $B_i$ and $B_a$.

According to one variant of the invention, the variable K has the value zero, and the criterion for the check stage S7b is that D be greater than or equal to K.

If the variable K has the preset value zero, this check stage means that the amount tendered must be greater than or equal to the requested amount if the device 90 is to be able to dispense any money. This provides the advantageous effect of limiting the amount of money dispensed by to a value lower than or equal to the amount received. Thereby financial losses, due to the wrong amount of change being handed out, are eliminated.

The stage S8B is performed if the above-described checking criteria have been satisfied. In stage S8B, information, such as amount tendered $B_i$, requested amount $B_a$ and the difference D, is delivered to the display arrangement 70 via the data port 60.

After stage S8B, the above-described stage S9 is carried out.

S10 After stage S9, the arrangement 50 generates a proceed signal which is delivered to the device 90.

On receiving the proceed signal, the device 90 carries out the measures which are needed for dispensing money amounting to a sum corresponding to the difference D. In addition, a counter mechanism which is internal to the payment-processing device 90, and which counts the tendered amounts relating to the current transaction, can be reset so that a new function cycle can be begun.

Figure 5:
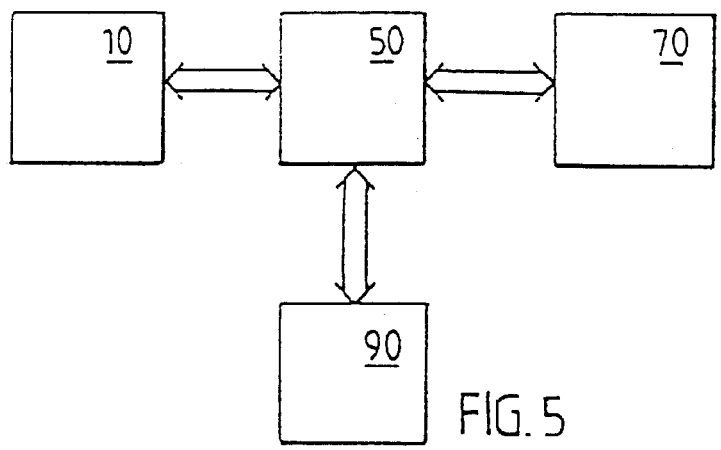
FIG. 5 shows a first embodiment of the system according to the present invention.

According to a first embodiment of the invention, which is shown in FIG. 5, the signal-processing unit 50 constitutes an individual unit which is physically separate from a cash register 10, a display arrangement 70 and a device 90 for processing payment means.

Figure 6:
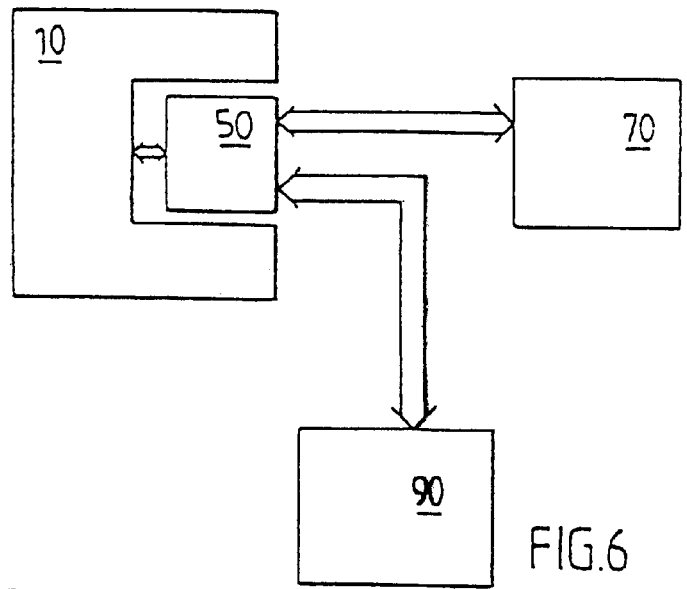
FIG. 6 shows a second embodiment of the system according to the present invention.
Figure 7:
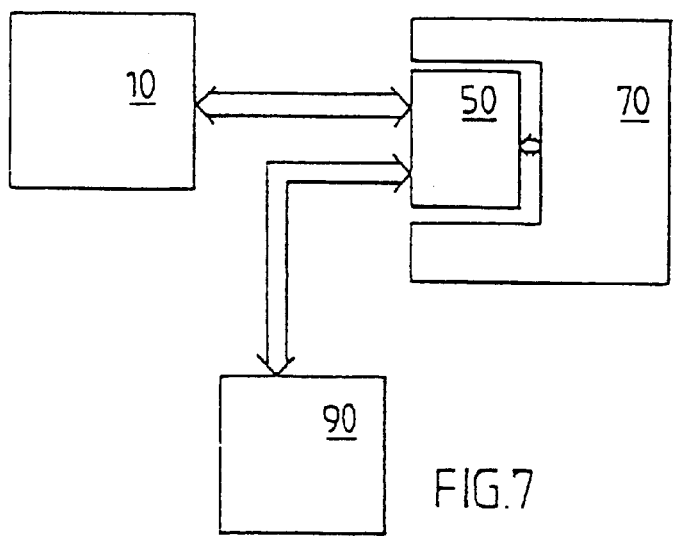
FIG. 7 shows a third embodiment of the system according to the present invention.
Figure 8:
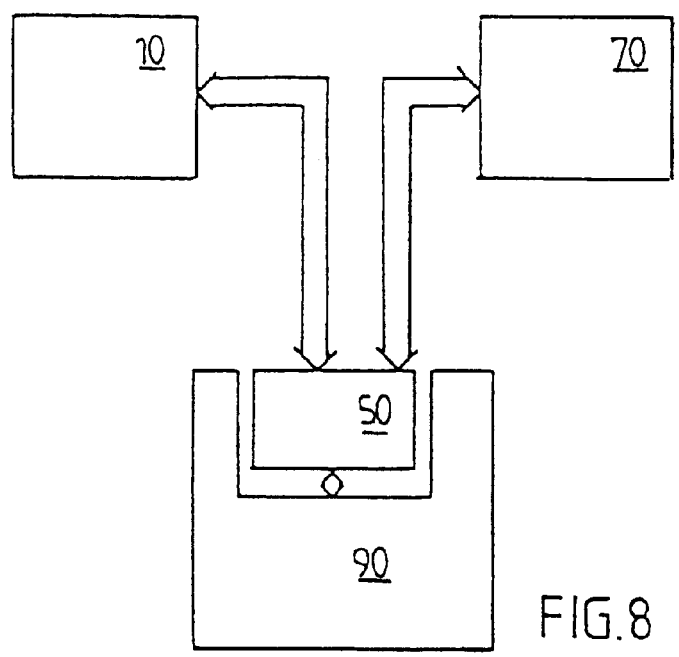
FIG. 8 shows a fourth embodiment of the system according to the present invention.

The second, third and fourth embodiments, which are shown in FIGS. 6, 7 and 8, respectively, show how the signal-processing unit 50 is an integrated part of, respectively, the cash register 10, the display arrangement 70 and the payment-processing device 90.

According to one version of the invention, which is useful at least in the embodiments shown in FIGS. 5, 7 and 8, the signal-processing device 50 emulates the communications interface of a display arrangement, such as a receipt printer. Hence, the communication between the device 50 and the device 10 is performed such that messages or signals may be transmitted in both directions.

Figure 9:
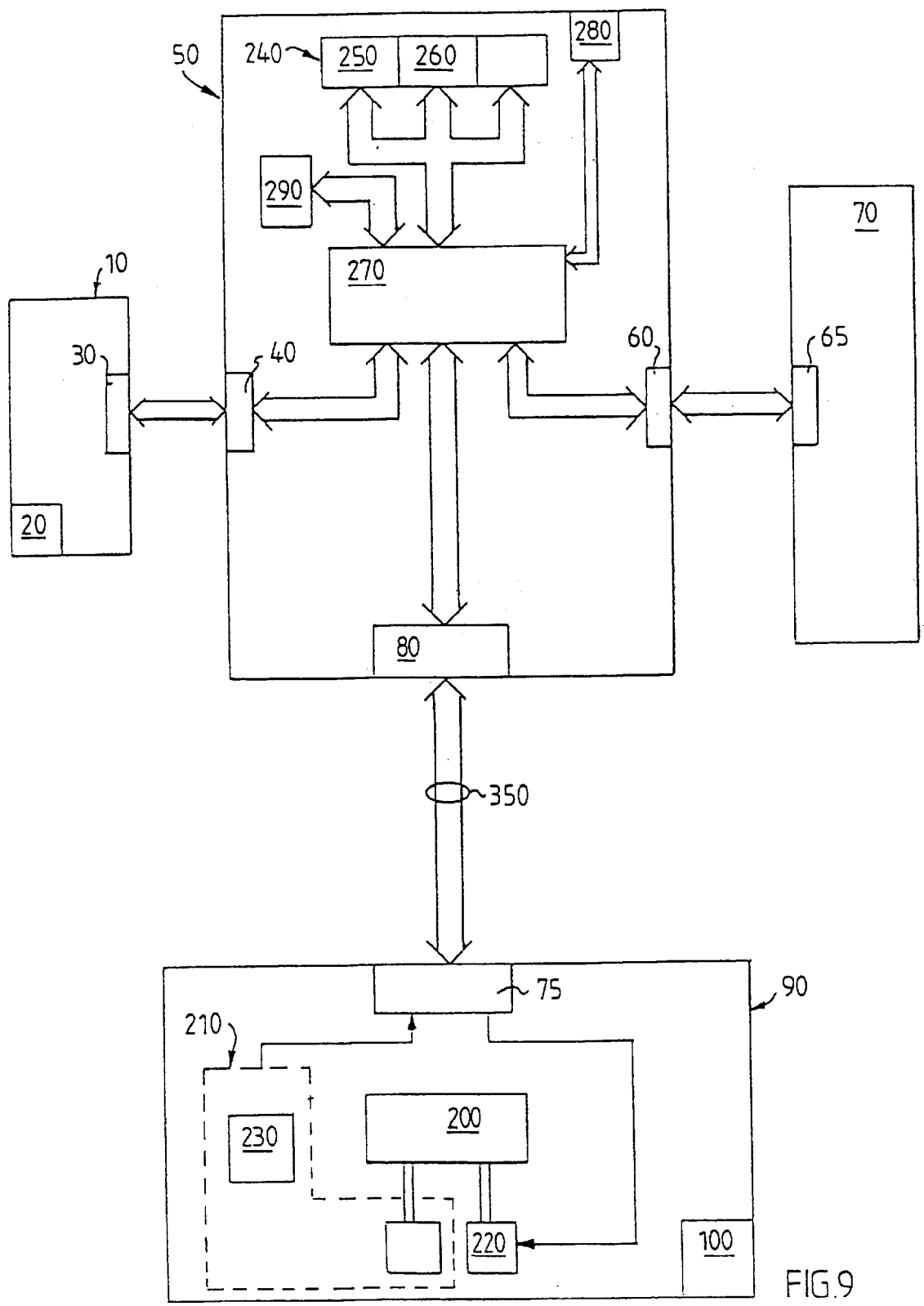
FIG. 9 shows a block diagram of a system for processing means of payment according to one embodiment.

FIG. 9 shows a block diagram of a system for processing payment means according to one embodiment. The system comprises a data input unit 20 which is integrated in the cash register 10. The data input unit 20 is intended for keying in a first data quantity, from which data quantity the first numerical value Ba can be calculated.

The data input unit 20 is arranged to provide the first data quantity in coded form, according to a first predetermined code, to the data bus 30 of the cash register. The term "first predetermined code" includes the manner and the order of delivery of the price information, the goods designation and the number of items of the goods. One type of input unit 20 may present the information in accordance to one specific code, while another type of cash register provides the same information in accordance to another specific code.

The first predetermined code may also be defined as the manner of transmission of the information which is supplied to the data port 40. Moreover the predetermined message indicating receipt finalized from the cash register 10 may differ from one type of cash register to another.

The system moreover comprises a storage member 200 which is integrated in the device 90 for processing payment means and which is used for storing the payment means, such as banknotes and coins. These payment means are arranged in the storage member 200 in a theft-proof manner and can be removed from the storage member only by means of a dispensing member 220 in compliance with a dispense signal.

The device 90 comprises at least one input unit 210 for feeding payment means into the storage member 200.

The input unit for payment means comprises a detector means 230 for generating a second numerical value Bi as a function of the payment means which are fed in. The second numerical value Bi corresponds to the amount of money tendered by a customer at the checkout point to which the device 90 is coupled.

The system moreover comprises a signal-processing arrangement 50 comprising a control means which is arranged to generate the dispense signal as a function of the first numerical value, i.e. the requested amount Ba, and the second numerical value, i.e. the amount tendered Bi. The control means comprises a first memory element 240 in which at least one selectable program routine is stored in a memory segment 250.

A second selectable program routine is stored in a second memory segment 260. A computer unit 270 is arranged to operate in accordance with the selected program routine. The memory element 240 can comprise a plurality of program routines, with each of the program routines being adapted so as to cause the computer unit to interpret the first data quantity in accordance with their respective specific codes. To set up the device 50 for communication with a specific type of cash register, a program routine is chosen which is adapted for this purpose. Thereby the signal-processing device 50 can be joined up to different types of cash registers as illustrated in FIG. 2 and to different types of display arrangements in an advantageously simple way.

The program routine can be selected by using a selector member 280 which can communicate with the computer unit 270. The selector member can comprise an array of hardware switches which can be set to the desired position by an operator. Alternatively, the selection can be made automatically on joining up the arrangement 50 to a cash register 10 or to a display member 70.

The arrangement 50 also comprises a memory element 290 for temporary storage of a predetermined number of messages constituting a part of the first data quantity. The signal-processing device 50 cooperates with the memory element 290, in accordance with instructions recorded in the memory 290, to control the communication between the cash register 10, the payment-processing device 90 and the display arrangement 70. The computer unit 270 is arranged to operate in accordance with the selected program routine such that the computer unit 270 in cooperation with the memory element 290 and the data ports 40, 60 and 80 at least temporarily stores a received message until the next consecutive message is received on data port 40. The resulting function of the signal-processing device 50 is described in connection with FIG. 10 below.

Figure 10:
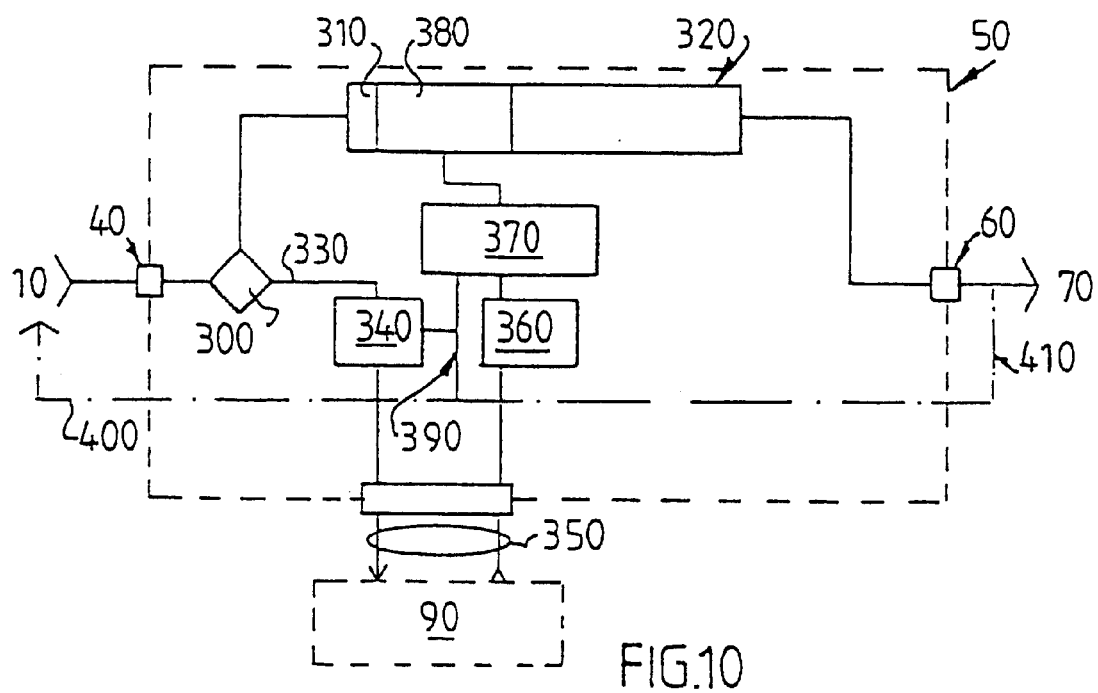
FIG. 10 shows a functional block diagram of the signal-processing unit 50.

FIG. 10 shows a functional block diagram of the signal-processing device 50. A first data quantity which is received from the port 40 passes through a detector means 300 which has the task of reading off data and detecting the data message 310 for receipt finalized.

The first data quantity comprises one or more messages or data sets. Each data set can comprise a character combination and one or more digits. The character combination can be, for example, a goods description, and the digits can represent quantity information and/or price information.

As long as the message indicating receipt finalized 310 does not appear, all data are conveyed onwards via a data buffer 320 to the data port 60. The data buffer 320 may, in physical embodiment, comprise a micro processor cooperating with a memory element 290 as described in connection with FIG. 9 above.

A receipt printer 70 can be coupled to the data port 60. The receipt printer 70 provides printouts of the data coming from the data port 60.

The data buffer 320 stores an arbitrary quantity of the data received from the port 40 in accordance with the "first in, first out" principle, and then delivers the information to the data port 60. Data destined for the receipt printer 70 is thereby initially delayed, but for such a short time that this does not affect the processing or the function of the cash register 10, and for a time which is sufficiently long for the signal-processing unit 50 to have the opportunity to process the data located in the buffer 320. A second data quantity is generated during this processing, and the final printout is thus manipulated.

When the detector means 300 detects the data code for receipt finalized 310, the receipt printer 70 is stopped instantaneously, after which a detection signal 330 is generated by the detector 300 and is delivered to a transmitter unit 340 which, via a data bus 350, delivers a request signal which requests the payment-processing device 90 to deliver information concerning the amount tendered Bi.

On receiving this request signal, the device 90 delivers information concerning the tendered amount Bi via the data bus 350 to a receiving unit 360. The receiving unit 360 and the transmitter unit 340 are included in the data port 80.

A calculating unit 370 calculates the difference D between the amount Bi from the device 90 processing the payment means, and the requested amount Ba delivered from the cash register 10. The requested amount Ba is located in the data buffer. The requested amount Ba is located in the first data quantity among the data which arrived at the buffer 320 before the data code for receipt finalized 310. This data set comprises a reference which is usually "subtotal" or "total", and a figure corresponding to the requested amount Ba.

If the amount Bi which is paid into the payment-processing device 90 is greater than or equal to the requested amount Ba from the cash register 10, the receipt will be finalized by supplying an information quantity 380 into the data buffer 320. The information quantity 380 is supplied ahead of the data code for receipt finalized 310. This information quantity 380 is preferably data sets comprising texts and sums of the requested amount Ba, the amount tendered Bi and any change to be returned D. This information quantity 380 and the data code for receipt finalized 310 constitute the concluding part of the second data quantity. When the whole of the second data quantity has been delivered to the data port 60, the receipt printer 70 is instructed to execute the final printout and finalize the receipt.

The calculating unit 370 generates a signal 390 as a function of the finalizing of the receipt, which signal 390 is delivered via the transmitting unit 340 to the payment-processing device 90 which is requested to pay out any difference D as change if the difference D is greater than zero. A counter mechanism which is internal to the payment-processing device 90 and is used for payments relating to the current transaction can then be reset so that a new function cycle can be begun.

If the response Bi from the payment-processing device 90 does not come to the requested amount, the transmitting unit 340 of the arrangement 50 delivers, according to one embodiment, a request signal to the payment-processing device 90. As a function thereof, the payment-processing device 90 communicates the message that further payment is required.

The receipt printer 70 will finalize the receipt only when it receives the code for receipt finalized 310. This does not occur until the payment comes to at least the amount requested by the cash register 10. The cash register 10 can also receive a wait signal 400 from the receipt printer 70 via a bus 410. Alternatively, the wait signal can be generated by the calculating unit 370 and is delivered to the cash register. The wait signal indicates that the printout is not yet ready, which can prevent the cash register 10 from beginning to register new entries in a new transaction corresponding to a new receipt

What is claimed is:

1. A payment processing system having a signal processing device (50) for enabling retrofitting an existing cash register with an automatic payment processing device without modifying the existing cash register, the payment processing system comprising:

an existing cash register (10) having internal software wherein the existing cash register (10) is coupled between a plurality of keying members (20) and an existing cash register data port (30) coupled to a housing, the existing cash register internal software adapted to tabulate the amounts of a sales transaction input by the plurality of keying members (20) and to make a permanent and cumulative record of the amounts of a sales transaction, a display arrangement (70) having at least one data port;

a payment processing device (90) having means for dispensing change and at least one data port, wherein the payment processing device (90) is a device for receiving and assessing bank notes and coins in a reliable manner and for supplying the correct amount of change;

a signal processing device (50) having a plurality of data ports, a first and third data port of the signal processing device (50) communicatively coupled between the data ports of the existing cash register (10) and the display arrangement (70), respectively, and a second data port of the signal processing device (50) communicatively coupled to the data port of the payment processing device (90), the signal processing device (50) comprising:

a means for identifying, among a plurality of types of cash registers with which the signal processing device is capable of communicating, an identified one from among the types of cash registers with which the signal processing device is capable of communicating to which the existing cash register belongs, means for setting up the signal processing device for communication with the identified type of cash register, means for receiving a first message from the existing cash register (10) based on the identified type of the existing cash register, the first message at least comprising information indicative of an amount of money requested, and for receiving a second message from the payment processing device (90), the second message at least comprising information indicative of an amount of money tendered, means for generating a third message as at least a function of the first message and the second message, the third message at least comprising information indicative of a difference between the amount of money tendered and the amount of money requested and at least comprising information indicative of an amount of change due, the means for generating further having means for interpreting the first message according to a first predetermined code, and means for transmitting the third message in a first predetermined manner to the display arrangement (70) and for transmitting the third message to the means for dispensing change in the payment processing device (90), the means for transmitting further having means for delivering the third message to display arrangement (70) according to a second predetermined code.

2. The payment processing system of claim 1, the means for generating further comprising means for calculating the amount of money requested from the first message, wherein the first message comprises a plurality of first communications wherein one first communication is a first numerical value corresponding to the amount of money requested, the signal processing device (50) further having means for detecting a first signal indicative of the end of the plurality of first communications, the means for transmitting adapted to transmit a request signal to the payment processing device (90) in response to the detection by the means for detecting of the first signal indicative of the end of the plurality of first communications, and the payment processing device (90) adapted to transmit the second message in response to receiving the request signal.

3. The payment processing system of claim 2, wherein the second message comprises a plurality of second communications wherein one second communication is a second numerical value corresponding to the amount of money tendered, and wherein the means for calculating is adapted to calculate the difference between the second numerical value, and the first numerical value.

4. The payment processing system of claim 3, wherein the means for calculating is further adapted to compare the difference between the second numerical value and the first numerical value to a predetermined value and wherein the means for transmitting the third message to the means for dispensing change in the payment processing device (90) is further adapted to transmit the third message to the means for dispensing change if the difference is greater than the predetermined value.

5. The payment processing system of claim 4, the signal processing device (50) further having a generated information quantity at least comprised of the first numerical value and the second numerical value, wherein the means for detecting is further adapted to detect a second signal indicative of the end of the plurality of second communications, and wherein the means for transmitting is adapted to transmit the generated information quantity to the display arrangement (70) before transmitting the second signal indicative of the end of the plurality of second communications to the display arrangement (70).

6. The payment processing system of claim 5, wherein the third message comprises a plurality of third communications, wherein the means for generating is adapted to generate a third signal indicative of the end of the plurality of third communications in response to the means for detecting the first signal indicative of the end of the plurality of first communications.

7. The payment processing system of claim 6, the signal processing device (50) further having means for storing at least one computer program routine and the means for generating further having a processor unit that is adapted to operating according to the at least one computer program routine.

8. The payment processing system of claim 7, wherein the means for dispensing change is a change dispenser, the means for generating is a first calculating unit, the means for transmitting is a first transmitting unit, the means for interpreting is a comparator, the means for delivering is a second transmitting unit, the means for calculating is a second calculating unit, the means for detecting is a detector, and the means for storing is a memory device.

9. The payment processing system of claim 1, wherein the means for identifying comprises a selector member.

10. The payment processing system of claim 9, wherein the selector member comprises an array of hardware switches.

11. The payment processing system of claim 1, wherein the means for identifying comprises a program routine adapted to automatically identify a type of the existing cash register upon connecting the existing cash register to the signal processing device.

12. The payment processing system of claim 1, wherein the means for identifying comprises a plurality of program routines, each of the program routines corresponding to one of the cash register types with which the signal processing device is capable of communicating.

13. The payment processing system of claim 12, wherein the means for identifying is constructed to automatically identify the type of the existing cash register upon connection to the existing cash register.

14. In a signal processing device (50) comprising a plurality of data ports wherein a first data port is adapted to communicatively couple the signal processing device (50) to an existing cash register (10), wherein a second data port is adapted to communicatively couple the signal processing device (50) to a payment processing device (90), and wherein a third data port is adapted to communicatively couple the signal processing device (50) to a display arrangement (70), a process comprising:

determining an identified type, from among a plurality of available types of cash registers with which the signal processing device is capable of working, to which the existing cash register belongs;

setting up the signal processing device for communication with the identified type of case register;

receiving, based upon the identified type of cash register, a first message at the first data port wherein the first message at least comprises information indicative of an amount of money requested;

receiving a second message at the second data port wherein the second message at least comprises information indicative of an amount of money tendered;

generating a third message as at least a function of the first message and the second message wherein the third message at least comprises information received at the first data port and information received at the second data port and is indicative of a difference between the amount of money tendered and the amount of money requested and at least comprising information indicative of an amount of change due;

transmitting the third message in a first predetermined manner to the third data port so as to enable the display arrangement (70) to display information in dependence on the third message; and transmitting information to the second data port so as to enable payment processing device (90) to pay out any change due, wherein the payment processing device (90) is a device for receiving and assessing bank notes and coins in a reliable manner and for supplying the correct amount of change.

15. A computer program product for use with a signal processing device (50) comprising a plurality of data ports wherein a first data port is adapted to communicatively couple the signal processing device (50) to an existing cash register (10), wherein a second data port is adapted to communicatively couple the signal processing device (50) to a payment processing device (90), and wherein a third data port is adapted to communicatively couple the signal processing device (50) to a display arrangement (70), the computer program product comprising:

a recording medium having information recorded thereon;

first means for receiving a first message at the first data port wherein the first message at least comprises information indicative of an amount of money requested;

means for identifying, among a plurality of types of cash registers with which the signal processing device is capable of communicating, an identified one from among the types of cash registers with which the signal processing device is capable of communicating to which the existing cash register belongs;

means for setting up the signal processing device for communication with the identified type of cash register;

second means for receiving a second message at the second data port wherein the second message at least comprises information indicative of an amount of money tendered;

means for generating a third message as at least a function of the first message and the second message wherein the third message at least comprises information received at the first data port and information received at the second data port and is indicative of a difference between the amount of money tendered and the amount of money requested and at least comprising information indicative of an amount of change due;

first means for transmitting the third message in a first predetermined manner to the third data port so as to enable the display arrangement (70) to display information in dependence on the third message; and second means for transmitting information to the second data port so as to enable payment processing device (90) to pay out any change due, wherein the payment processing device (90) is a device for receiving and assessing bank notes and coins in a reliable manner and for supplying the correct amount of change.

16. The computer program product of claim 15, the recording medium further having recorded thereon first means for directing the signal processing device (50) to interpret the first message according to a first predetermined code, and second means for directing the signal processing device (50) to deliver the third message to the third data port according to a second predetermined code.

17. The computer program product of claim 16, the recording medium further having recorded thereon third means for directing the signal processing device (50) to calculate the amount of money requested from the first message, wherein the first message comprises a plurality of first communications wherein one first communication is a first numerical value corresponding to the amount of money requested, fourth means for directing the signal processing device (50) to detect a first signal indicative of the end of the plurality of first communications, fifth means for directing signal processing device (50) to deliver a request signal to the second data port in response to detecting the first signal indicative of the end of the plurality of first communications, and sixth means for directing the signal processing device (50) to await receipt of the second message in response to delivering the request signal.

18. The computer program product of claim 17, the recording medium further having recorded thereon seventh means for directing the signal processing device (50) to compare the difference between the second numerical value and the first numerical value to a predetermined value, and eighth means for directing the signal processing device (50) to deliver the third message to the second data port if the difference is greater than the predetermined value.

19. The computer program product of claim 18, wherein each means for directing that is recorded within the recording medium is a set of instructions for at least one of solving a problem and processing data and further wherein the first means for receiving is a first receiver, wherein the second means for receiving is a second receiver, wherein the means for generating comprises a first calculating unit, a comparitor, and a second calculating unit, wherein the first means for transmitting is a first transmitting unit, wherein the second means for transmitting is a second transmitting unit, and wherein the means for storing is a memory device.

* * * * *